(12) United States Patent
Nandagopalan et al.

(10) Patent No.: US 8,611,821 B2
(45) Date of Patent: *Dec. 17, 2013

(54) COMMUNICATION DEVICE THAT DETECTS AND ADAPTS TO THE PRESENCE OF OTHER DEVICES AND METHODS FOR USE THEREWITH

(75) Inventors: Saishankar Nandagopalan, San Diego, CA (US); Jeyhan Karaoguz, Irvine, CA (US); Jason A. Trachewsky, Menlo Park, CA (US); Vinko Erceg, Cardiff by the Sea, CA (US); Matthew J. Fischer, Mountain View, CA (US); Christopher J. Hansen, Sunnyvale, CA (US); Murat Mese, Rancho Palos Verdes, CA (US)

(73) Assignee: Broadcom Corporation, Irvine, CA (US)

( * ) Notice: Subject to any disclaimer, the term of this patent is extended or adjusted under 35 U.S.C. 154(b) by 879 days.

This patent is subject to a terminal disclaimer.

(21) Appl. No.: 12/431,085

(22) Filed: Apr. 28, 2009

(65) Prior Publication Data

US 2010/0273523 A1    Oct. 28, 2010

(51) Int. Cl.
*H04M 1/00* (2006.01)
*H04W 72/00* (2009.01)
*H04L 12/413* (2006.01)
*H04L 12/28* (2006.01)
*G08C 15/00* (2006.01)
*H04B 15/00* (2006.01)

(52) U.S. Cl.
USPC ....... 455/63.1; 455/552.1; 455/450; 370/445; 370/431; 370/252

(58) Field of Classification Search
USPC ........ 455/552.1, 550.1–553.1, 450–455, 464, 455/423, 513, 405, 63.1, 67.13, 114.2, 501, 455/570, 222, 278.1, 283, 296; 370/431, 370/445, 254, 252, 317
See application file for complete search history.

(56) References Cited

U.S. PATENT DOCUMENTS

| | | | |
|---|---|---|---|
| 5,936,578 A | 8/1999 | Driessen et al. | |
| 5,978,666 A | 11/1999 | Faulkner et al. | |
| 6,006,069 A | 12/1999 | Langston | |
| 6,016,305 A * | 1/2000 | Borst et al. ................ | 370/234 |
| 6,201,454 B1 | 3/2001 | Kinayman et al. | |
| 6,571,258 B1 | 5/2003 | Borowsky et al. | |
| 6,868,258 B2 | 3/2005 | Hayata et al. | |
| 7,852,860 B2 | 12/2010 | Aizu et al. | |
| 8,032,167 B2 | 10/2011 | Karaoguz et al. | |
| 2003/0171103 A1 | 9/2003 | Shields | |

(Continued)

*Primary Examiner* — Vladimir Magloire
*Assistant Examiner* — Michael Mapa
(74) *Attorney, Agent, or Firm* — Garlick & Markison; Bruce E. Stuckman (57) ABSTRACT

An adaptive communication device includes a transceiver that communicates with a first remote communication device in a millimeter wave frequency band in accordance with a first protocol. The transceiver generates conflict detection signals based on signals received from a second remote communication device that communicates in accordance with a second protocol. A conflict detection module detects communication by the second communication device based on the conflict detection signals and generates a model trigger signal in response thereto. A conflict modeling module responds to the model trigger signal by generating idle prediction data based on the conflict detection signals, wherein the idle prediction data predicts an idle period in the communications by the second remote communication device. A transmission control module generates transmit control signals based on the idle prediction data, wherein the transceiver times transmissions sent to the first remote communication device based on the transmit control signals.

19 Claims, 7 Drawing Sheets

(56) References Cited

U.S. PATENT DOCUMENTS

| | | |
|---|---|---|
| 2005/0134514 A1* | 6/2005 | Navarro .................. 343/772 |
| 2005/0239497 A1* | 10/2005 | Bahl et al. .................. 455/552.1 |
| 2006/0291483 A1 | 12/2006 | Sela |
| 2007/0165578 A1 | 7/2007 | Yee et al. |
| 2008/0177886 A1* | 7/2008 | Singh et al. ................... 709/228 |
| 2008/0304445 A1 | 12/2008 | Chou |
| 2010/0113042 A1* | 5/2010 | Kasslin et al. ................ 455/450 |
| 2011/0021146 A1* | 1/2011 | Pernu .......................... 455/41.2 |

* cited by examiner

COMMUNICATION DEVICE THAT DETECTS AND ADAPTS TO THE PRESENCE OF OTHER DEVICES AND METHODS FOR USE THEREWITH

CROSS REFERENCE TO RELATED PATENTS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to wireless communication and more particularly to transceivers used to support wireless communications in unlicensed spectra.

2. Description of Related Art

Communication systems are known to support wireless and wireline communications between wireless and/or wireline communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, RFID, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Currently, wireless communications occur within licensed or unlicensed frequency spectrums. For example, wireless local area network (WLAN) communications occur within the unlicensed Industrial, Scientific, and Medical (ISM) frequency spectrum of 900 MHz, 2.4 GHz, and 5 GHz. While the ISM frequency spectrum is unlicensed there are restrictions on power, modulation techniques, and antenna gain. Another unlicensed frequency spectrum is the V-band of 55-64 GHz.

Different radio networks sometimes share the same spectrum. For example, Bluetooth transceivers and 802.11g transceivers may both be present in a single area using the 2.4 GHz band. In the V-band, devices using Wireless HD (WiHD) and devices using the Next Generation Microwave System (NGMS) may be present in a single area. Transmissions by one device can cause interference with other devices that use the same frequency band with the same area.

Other disadvantages of conventional approaches will be evident to one skilled in the art when presented the disclosure that follows.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
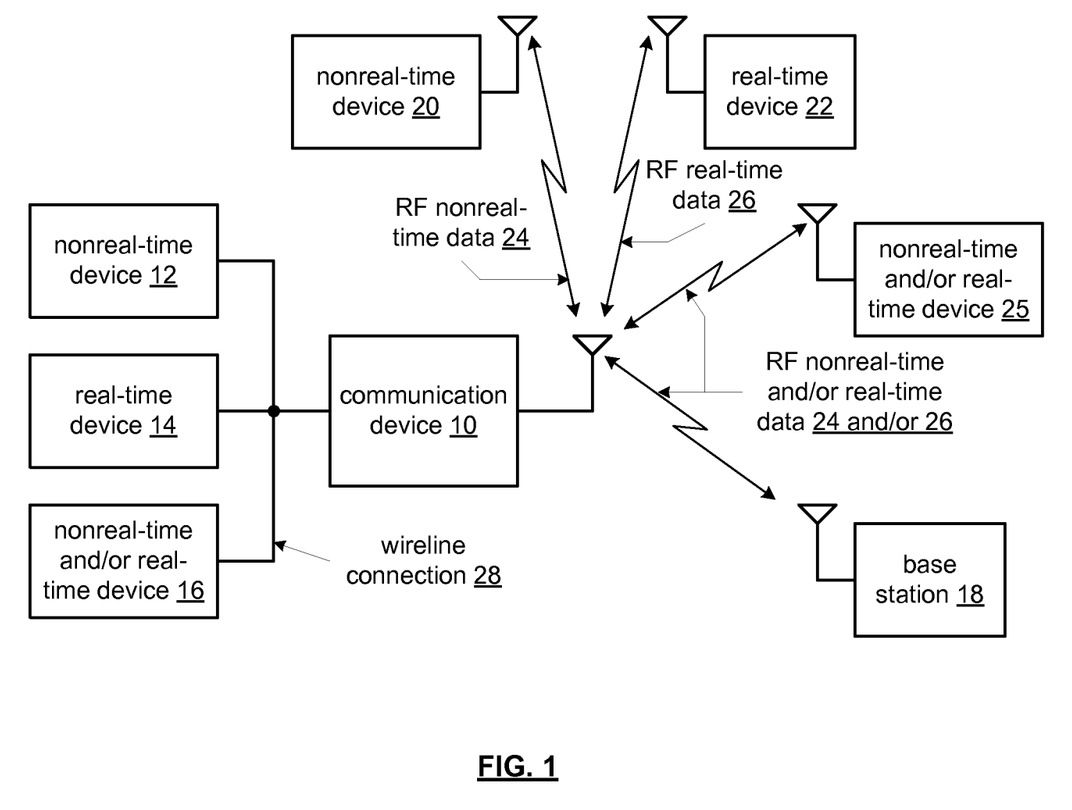
FIG. 1 is a schematic block diagram of an embodiment of a wireless communication system in accordance with the present invention.

FIG. 1 is a schematic block diagram of an embodiment of a communication system in accordance with the present invention. In particular a communication system is shown that includes a communication device 10 that communicates real-time data 24 and/or non-real-time data 26 wirelessly with one or more other devices such as base station 18, non-real-time device 20, real-time device 22, and non-real-time and/or real-time device 25. In addition, communication device 10 can also optionally communicate over a wireline connection with non-real-time device 12, real-time device 14, non-real-time and/or real-time device 16.

In an embodiment of the present invention the wireline connection 28 can be a wired connection that operates in accordance with one or more standard protocols, such as a universal serial bus (USB), Institute of Electrical and Electronics Engineers (IEEE) 488, IEEE 1394 (Firewire), Ethernet, small computer system interface (SCSI), serial or parallel advanced technology attachment (SATA or PATA), or other wired communication protocol, either standard or proprietary. The wireless connection can communicate in accordance with a wireless network protocol such as WiHD, NGMS, IEEE 802.11, Bluetooth, Ultra-Wideband (UWB), WIMAX, or other wireless network protocol, a wireless telephony data/voice protocol such as Global System for Mobile Communications (GSM), General Packet Radio Service (GPRS), Enhanced Data Rates for Global Evolution (EDGE), Personal Communication Services (PCS), or other mobile wireless protocol or other wireless communication protocol, either standard or proprietary. Further, the wireless communication path can include separate transmit and receive paths that use separate carrier frequencies and/or separate frequency channels. Alternatively, a single frequency or frequency channel can be used to bi-directionally communicate data to and from the communication device 10.

Communication device 10 can be a mobile phone such as a cellular telephone, a personal digital assistant, game console, personal computer, laptop computer, or other device that performs one or more functions that include communication of voice and/or data via wireline connection 28 and/or the wireless communication path. In an embodiment of the present invention, the real-time and non-real-time devices 12, 14 16, 18, 20, 22 and 25 can be personal computers, laptops, PDAs, mobile phones, such as cellular telephones, devices equipped with wireless local area network or Bluetooth transceivers, FM tuners, TV tuners, digital cameras, digital camcorders, or other devices that either produce, process or use audio, video signals or other data or communications.

In operation, the communication device includes one or more applications that include voice communications such as standard telephony applications, voice-over-Internet Protocol (VoIP) applications, local gaming, Internet gaming, email, instant messaging, multimedia messaging, web browsing, audio/video recording, audio/video playback, audio/video downloading, playing of streaming audio/video, office applications such as databases, spreadsheets, word processing, presentation creation and processing and other voice and data applications. In conjunction with these applications, the real-time data 26 includes voice, audio, video and multimedia applications including Internet gaming, etc. The non-real-time data 24 includes text messaging, email, web browsing, file uploading and downloading, etc.

In an embodiment of the present invention, the communication device 10 includes a wireless transceiver that includes one or more features or functions of the present invention. Such wireless transceivers shall be described in greater detail in association with FIGS. 3-10 that follow.

Figure 2:
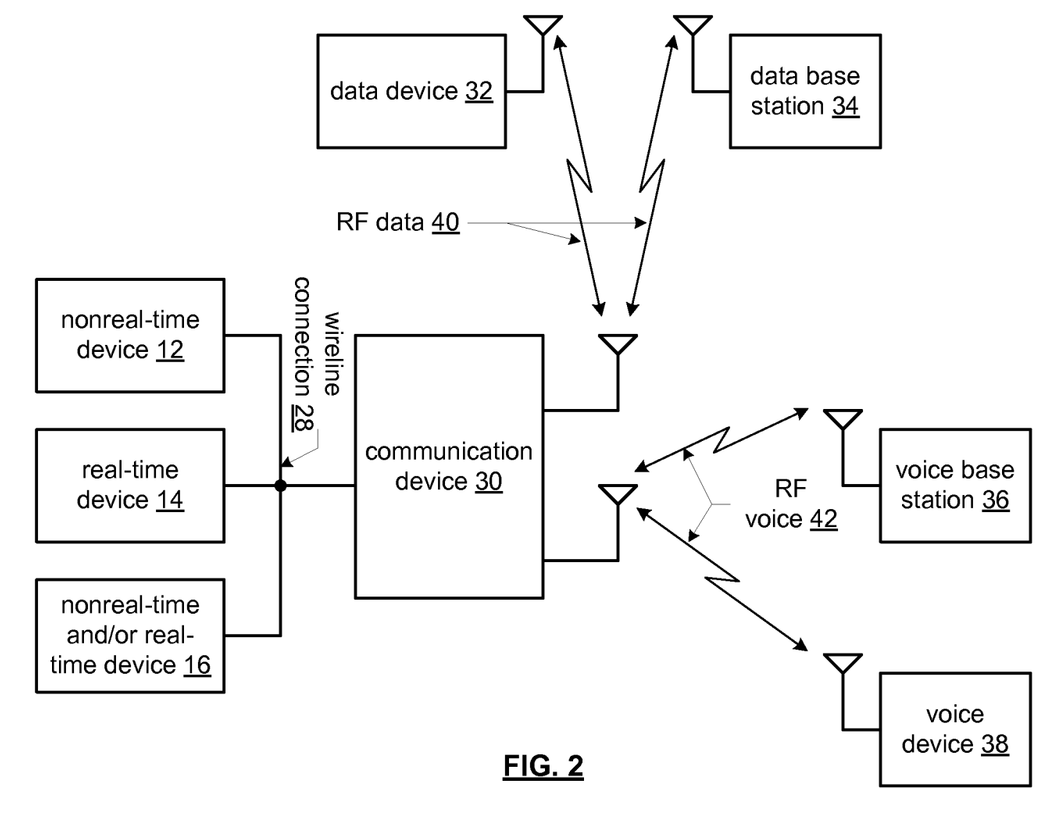
FIG. 2 is a schematic block diagram of another embodiment of a wireless communication system in accordance with the present invention.

FIG. 2 is a schematic block diagram of an embodiment of another communication system in accordance with the present invention. In particular, FIG. 2 presents a communication system that includes many common elements of FIG. 1 that are referred to by common reference numerals. Communication device 30 is similar to communication device 10 and is capable of any of the applications, functions and features attributed to communication device 10, as discussed in conjunction with FIG. 1. However, communication device 30 includes two separate wireless transceivers for communicating, contemporaneously, via two or more wireless communication protocols with data device 32 and/or data base station 34 via RF data 40 and voice base station 36 and/or voice device 38 via RF voice signals 42.

Figure 3:
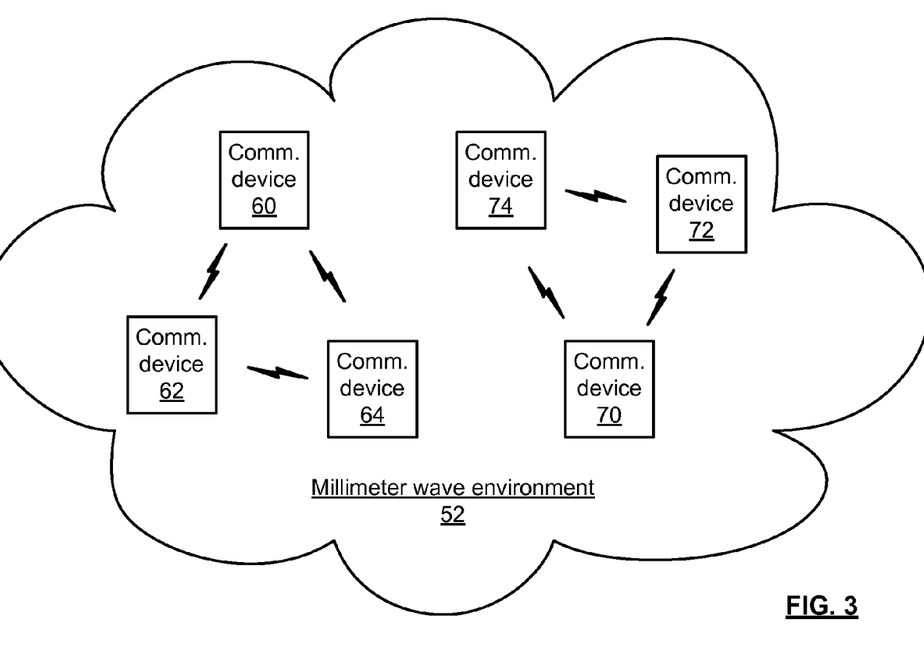
FIG. 3 is a schematic block diagram of an embodiment of a millimeter wave environment 52 in accordance with the present invention.

FIG. 3 is a schematic block diagram of an embodiment of a millimeter wave environment 52 in accordance with the present invention. In particular, the millimeter wave environment 52 can include the V-band of 55-64 GHz or other millimeter wave frequency band or unlicensed spectrum that is shared by two groups of communication devices operating via different protocols. For example, communication devices 60, 62, 64, . . . are examples of communication devices 10 or 30 that communicate with one another in accordance with a WiHD protocol. Further, communication devices 70, 72, and 74 are further examples of communication devices 10 or 30 that communicate with one another in accordance with a NGMS protocol. Transmissions by devices in the group 60, 62, 64, . . . can cause interference with devices in the group 70, 72, 74, . . . and vice versa. However, one or more of the communications devices 60, 62, 64, 70, 72, and 74 are adaptive to communications by devices in the other group and time their transmissions during predicted idle periods to reduce interference.

Further details regarding communication devices 60, 62, 64, 70, 72, and 74, including several optional functions and features, will be presented in conjunction with FIGS. 4-10 that follow.

Figure 4:
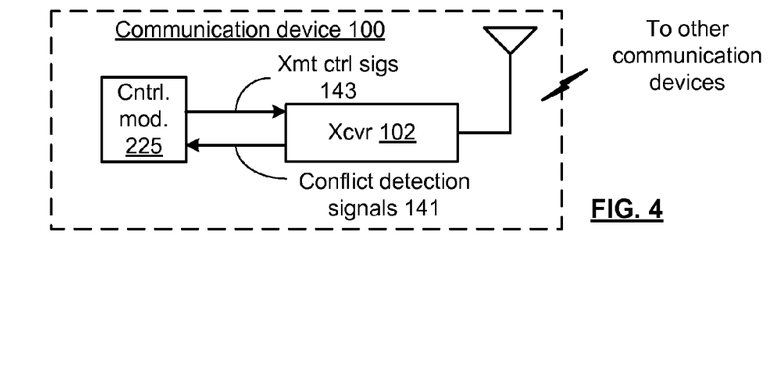
FIG. 4 is a schematic block diagram of an embodiment of a communication device 100 in accordance with the present invention.

FIG. 4 is a schematic block diagram of an embodiment of a communication device 100 in accordance with the present invention. In particular, an communication device 100, such as communication device 10, 30, 60, 62, 64, 70, 72, and 74, operates in a millimeter wave environment 52 or other unlicensed spectrum. Transceiver 102 communicates with other communication devices in its own group of devices in accordance with a protocol such as NGMS or WiHD. However, transceiver 102 is subject to interference by one or more other groups of devices operating in the same spectrum but in accordance with different protocols. For example, transceiver 102 can be a WiHD transceiver that communicates with other WiHD devices, yet is subject to interference from NGMS devices. Further, transceiver 102 can be a NGMS transceiver that communicates with other NGMS devices, yet is subject to interference from WiHD devices.

In operation, transceiver 102 generates conflict detection signals 141 based on signals received in the millimeter wave frequency band from one or more communication devices that operate in conjunction with the other protocol. Control module 225 detects the presence of one or more other communication devices based on the conflict detection signals 141 and models the operation of these devices in order to predict the occurrence of an idle period in the communications by these devices. Control module 225 generates transmit control signals 143 for timing transmissions sent by transceiver 102 for devices in its own group to coincide with the predicted idle period of the devices communicating in accordance with the other protocol.

Figure 5:
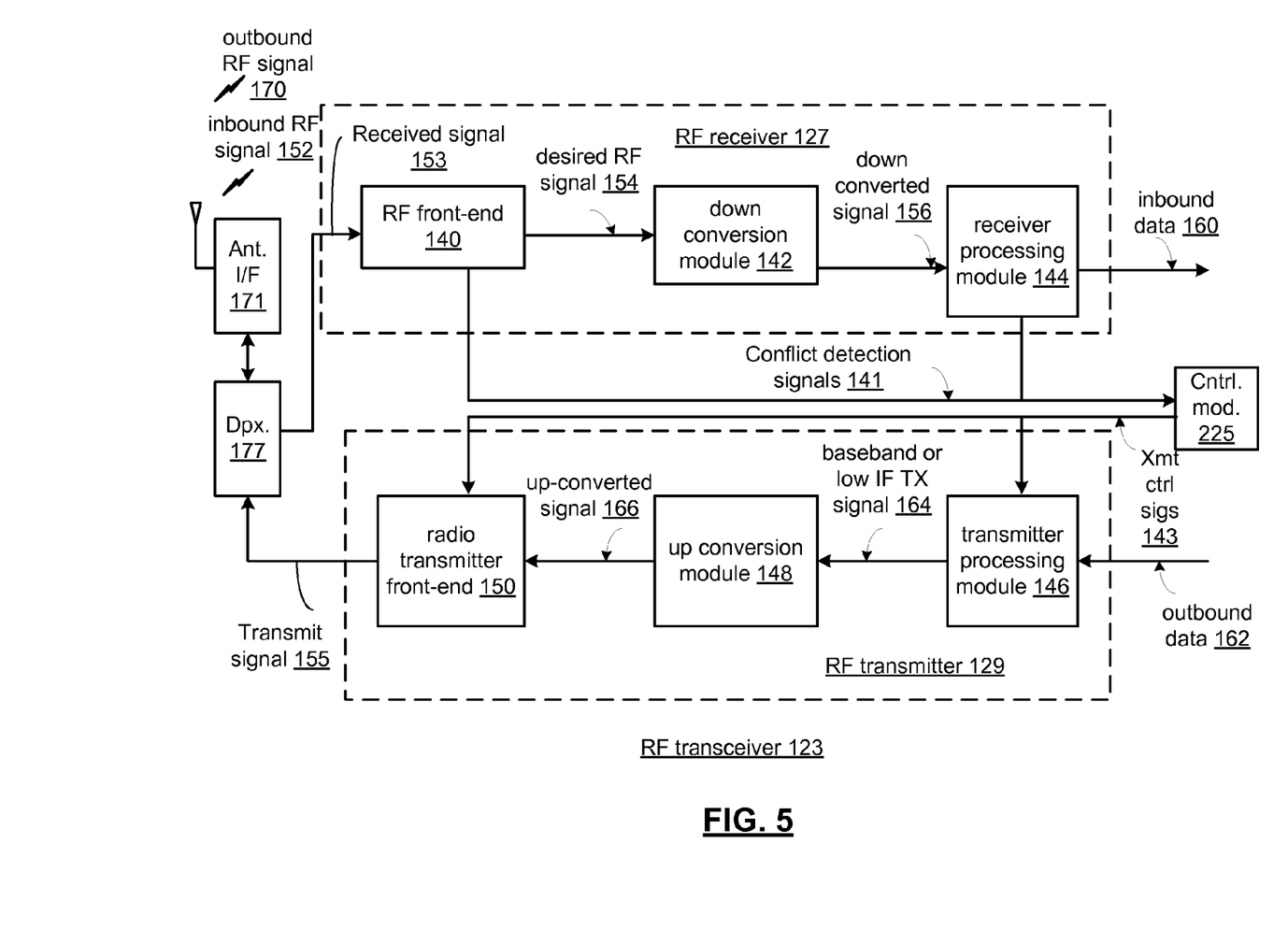
FIG. 5 is a schematic block diagram of an embodiment of an RF transceiver 123 in accordance with the present invention.

FIG. 5 is a schematic block diagram of an embodiment of an RF transceiver 123 in accordance with the present invention. The RF transceiver 123, such as transceiver 102, includes an RF transmitter 129, and an RF receiver 127. The RF receiver 127 includes a RF front end 140, a down conversion module 142 and a receiver baseband processing module 144. The RF transmitter 129 includes a transmitter baseband processing module 146, an up conversion module 148, and a radio transmitter front-end 150 and operates under control of transmit control signals 143

As shown, the receiver and transmitter are each coupled to an antenna through an antenna interface 171 and a diplexer (duplexer) 177, such as antenna interface 72 or 74, that couples the transmit signal 155 to the antenna to produce outbound RF signal 170 and couples inbound signal 152 to produce received signal 153. Alternatively, a transmit/receive switch can be used in place of diplexer 177. While a single antenna is represented, the receiver and transmitter may share a multiple antenna structure that includes two or more antennas. In another embodiment, the receiver and transmitter may share a multiple input multiple output (MIMO) antenna structure, diversity antenna structure, phased array or other controllable antenna structure that includes a plurality of antennas. Each of these antennas may be fixed, programmable, and antenna array or other antenna configuration.

In operation, the transmitter receives outbound data 162 from other portions of its a host device or other source via the transmitter processing module 146. The transmitter processing module 146 processes the outbound data 162 in accordance with a particular wireless communication standard (e.g., WiHD, NGMS) to produce baseband or low intermediate frequency (IF) transmit (TX) signals 164 that contain outbound data 162. The baseband or low IF TX signals 164 may be digital baseband signals (e.g., have a zero IF) or digital low IF signals, where the low IF typically will be in a frequency range of one hundred kilohertz to a few megahertz. Note that the processing performed by the transmitter processing module 146 can include, but is not limited to, scrambling, encoding, puncturing, mapping, modulation, and/or digital baseband to IF conversion.

The up conversion module 148 includes a digital-to-analog conversion (DAC) module, a filtering and/or gain module, and a mixing section. The DAC module converts the baseband or low IF TX signals 164 from the digital domain to the analog domain. The filtering and/or gain module filters and/or adjusts the gain of the analog signals prior to providing it to the mixing section. The mixing section converts the analog baseband or low IF signals into up-converted signals 166 based on a transmitter local oscillation.

The radio transmitter front end 150 includes a power amplifier and may also include a transmit filter module. The power amplifier amplifies the up-converted signals 166 to produce outbound RF signals 170, which may be filtered by the transmitter filter module, if included. The antenna structure transmits the outbound RF signals 170 to a targeted device such as a RF tag, base station, an access point and/or another wireless communication device via an antenna interface 171 coupled to an antenna that provides impedance matching and optional bandpass filtration.

As discussed in conjunction with FIG. 4, control module 225 generates transmit control signals 143 to time transmissions by RF transmitter 129 to coincide with idle period of other devices operating with conflicting protocols that may be unaware of the communication device, such as communication device 100, that contains RF transceiver 123. In particular, transmit control signals 143 can control transmitter processing module 146 to generate baseband or low IF transmit signal 164 for transmission during anticipated idle periods. Further transmit control signals 143 can optionally enable radio transmitter front-end 150 to generate transmit signals 155 during these predicted idle periods. The transmit control signals 143 can be analog signals, digital signals, discrete-time signals of other signals that control the modules of RF transceiver 123 to adapt to communication based on the conflict detection signals received from control module 225.

The receiver receives inbound RF signals 152 via the antenna and antenna interface 171 that operates to process the inbound RF signal 152 into received signal 153 for the receiver front-end 140. In general, antenna interface 171 provides impedance matching of antenna to the RF front-end 140, optional bandpass filtration of the inbound RF signal 152.

The down conversion module 142 includes a mixing section, an analog to digital conversion (ADC) module, and may also include a filtering and/or gain module. The mixing section converts the desired RF signal 154 into a down converted signal 156 that is based on a receiver local oscillation, such as an analog baseband or low IF signal. The ADC module converts the analog baseband or low IF signal into a digital baseband or low IF signal. The filtering and/or gain module high pass and/or low pass filters the digital baseband or low IF signal to produce a baseband or low IF signal 156. Note that the ordering of the ADC module and filtering and/or gain module may be switched, such that the filtering and/or gain module is an analog module.

The receiver processing module 144 processes the baseband or low IF signal 156 in accordance with a particular wireless communication standard (e.g., WiHD, NGMS) to produce inbound data 160. The processing performed by the receiver processing module 144 includes, but is not limited to, digital intermediate frequency to baseband conversion, demodulation, demapping, depuncturing, decoding, and/or descrambling.

RF front-end 140 and/or receiver processing module generates the conflict detection signals 141 that can be used to detect the presence of other communication devices operating in the same frequency band but with other protocols and further to characterize the transmission from these devices in order to predict idle periods. In conflict detection signals 141 can be generated based on a signal strength indication such as a received signal strength, signal to noise ratio or signal to interference ratio. Further conflict detection signals 141 can be generated based on a bit error rate, a packet error rate and/or a retransmission rate. For example, the presence of a high signal strength in combination with a low bit error rate, a packet error rate or a retransmission rate, indicates a strong source of interference.

In another embodiment of the present invention, conflict detection signals 141 can be generated based on the detection of a frequency spectrum indicative of transmission in accordance with the second protocol. For instance, RF front-end 140 can include a matched filter or other spectral detector corresponding to transmissions that could be present in another protocol that generates conflict detection signals 141 when such signaling is present. In a further embodiment of the present invention, signaling in accordance with the other protocol can include a preamble or other signal that includes a specific tone pattern indicating communication in with the other protocol. RF front-end 140 can include can include a matched filter, correlator or other detector that responds to such a tone sequence and that that generates conflict detection signals 141 when such signaling is present.

Receiver processing module 144, transmitter processing module 146 and control module 225 can each be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the receiver processing module 144, transmitter processing module 146 or control module 225 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

Figures 6, 7:
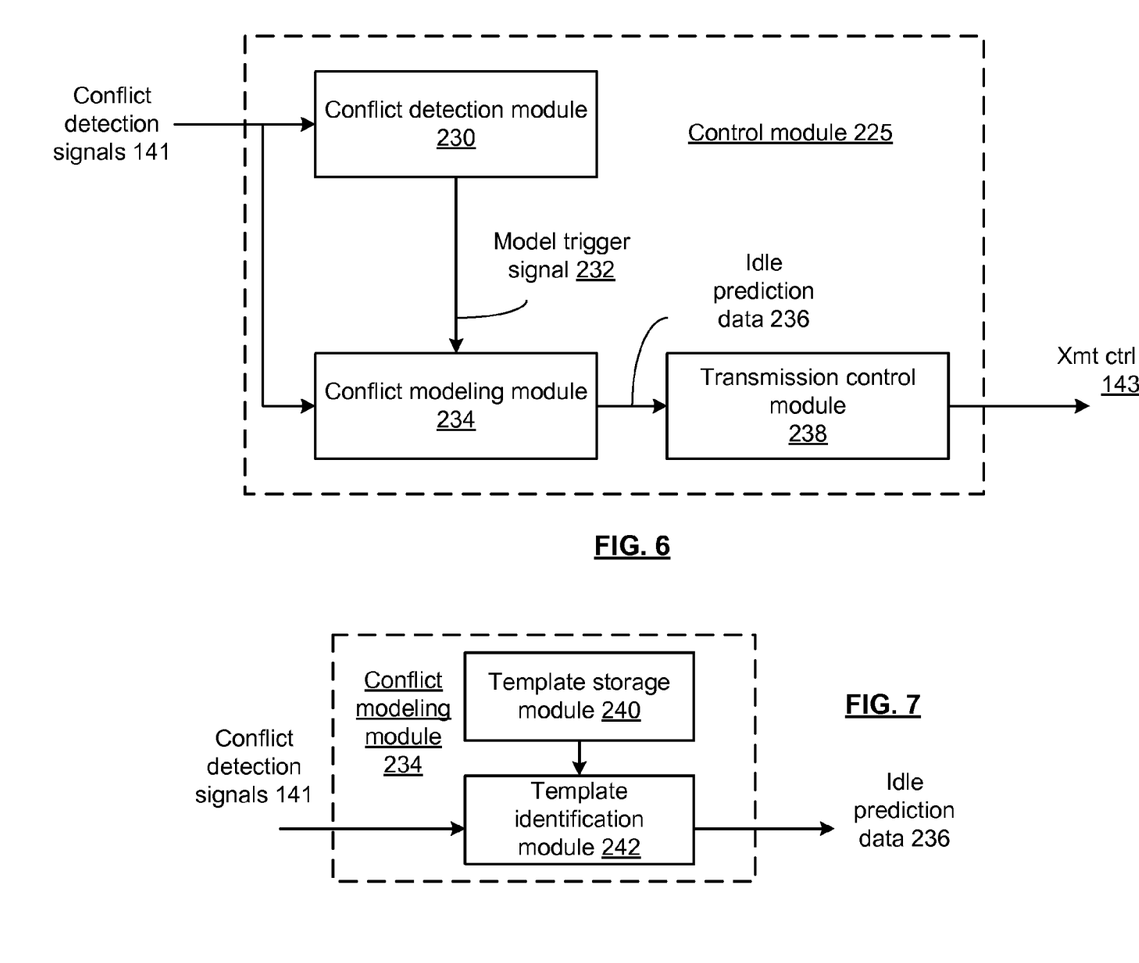
FIG. 6 is a schematic block diagram of an embodiment of a control module 225 in accordance with the present invention.
FIG. 7 is a schematic block diagram of a conflict modeling module 234 in accordance an embodiment of the present invention.

FIG. 6 is a schematic block diagram of an embodiment of a control module 225 in accordance with the present invention. In this embodiment, control module 225 includes a conflict detection module 230 that detects communication by a communication device operating in conjunction with another protocol, based on the conflict detection signals 141. As discussed in conjunction with FIG. 5, conflict detection signal can determine, based on a high signal strength in combination with a low bit error rate, a packet error rate or a retransmission rate, that a potentially conflicting communication device is operating in conjunction with another protocol. Further, conflict detection module 230 can operate based on the detection of tone signals or the detection a frequency spectrum indicating communications by another protocol. In any case, when the presence of a potentially conflicting communication device is detected conflict detection module 230 generates a module trigger signal 232.

Conflict modeling module 234 responds to the model trigger signal 232 by generating idle prediction data 236 based on the conflict detection signals 141. In particular, the idle prediction data 236 predicts an idle period in the communications by the potentially conflicting communication device.

For instance, the conflict modeling module 234 can analyze the conflict detection signals 141, and based on the detection of special tone signaling, a characteristic frequency spectrum, time of the interference, etc. identify the specific protocol used by potentially conflicting communication device. Once the particular protocol is identified, the conflict modeling module can analyze the timing of the conflict detection signals 141, such as the duration of interference and observed idle periods and a comparison to know characteristics of the protocol that was identified to generate the idle prediction data 236 to predict an upcoming idle period or the duration of an idle period that has begun.

Further, the conflict modeling module 234 can identify characteristics of the protocol in use by the potentially conflicting communication device such as the data rate and further use this information to generate the idle prediction 236. Further, the conflict modeling module can perform a statistical analysis of the conflict detection signals 141 to characterize the expected duration of interference periods, the expected duration of idle periods, to cluster interference periods and idle periods in groups, to correlate idle periods of a particular duration to interference periods that proceed them and to perform other statistical analysis in order to generate idle prediction data 236 to predict one or more upcoming idle periods.

The transmission control module 236 generates transmit control signals 143 based on the idle prediction data 236. In particular, transmission control module 236 operates to generate transmit control signals 143 to trigger the transmission by transceiver 102 in periods of time coinciding with anticipated idle periods.

FIG. 7 is a schematic block diagram of a conflict modeling module 234 in accordance an embodiment of the present invention. In particular, conflict modeling module 234 includes a template storage module 240 that stores a plurality of templates. Template identification module 242 identifies one of the plurality of templates based on the conflict detection signals 141 and that generates the idle prediction data 236 based on the identified one of the plurality of templates.

In an embodiment of the present invention, template storage module 240 stores a plurality of temporal patterns representing interference periods and idle periods that can occur based on typical communications between potentially interfering communication devices with differing data rates and/or differing protocols that may share the millimeter wave environment 52. Template identification module 242 can identify a protocol and/or data rate in use by potentially interfering communication devices by matching the temporal patterns in conflict detection signals 141 to the one of the stored templates based on a least squares analysis, best fit algorithm or other curve fitting or statistical distance measure. Further, once a stored template is identified, idle prediction data 236 can be generated by extrapolating forward based on the identified template.

Figure 8:
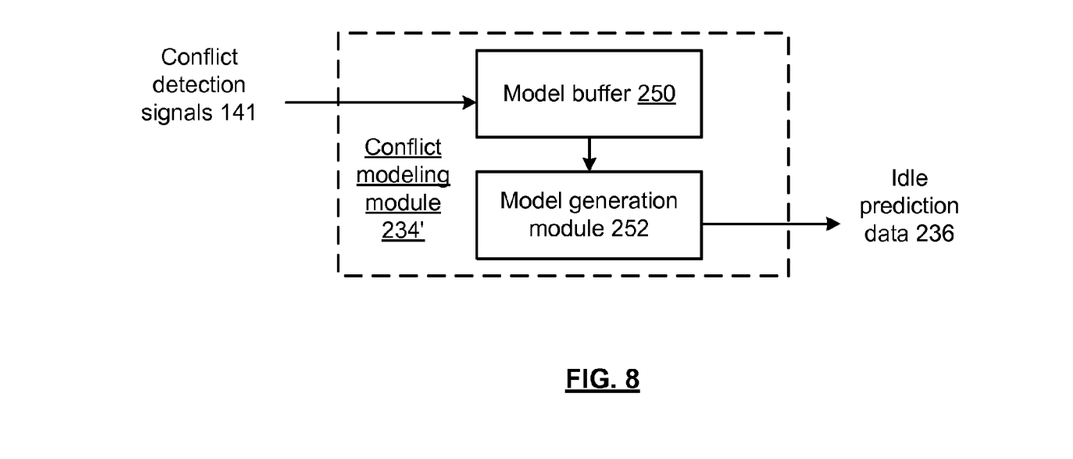
FIG. 8 is a schematic block diagram of a conflict modeling module 234' in accordance another embodiment of the present invention.

FIG. 8 is a schematic block diagram of a conflict modeling module 234' in accordance another embodiment of the present invention. The conflict modeling module 234' performs a similar function to conflict modeling module 234 but operates in a different way. In particular, conflict modeling module 234' includes a model buffer 250 that aggregates the conflict detection signals. Model generation module 252 generates a model based on the aggregation of the conflict detection signals 141 and generates the idle prediction data based on the model 236.

In particular, model generation module 252 and model buffer 250 can be implemented via a learning engine such as a neural network, iterative statistical model or other iterative model that characterizes the expected duration of interference periods, the expected duration of idle periods, clusters interference periods and idle periods in groups, correlate idle periods of a particular duration to interference periods that proceed them and/or that performs other statistical analysis in order to generate idle prediction data 236. In operation, the model buffer 250 updates the aggregation of the conflict detection signals 141 as more data is collected and the model generation module 252 updates the model based on the updated aggregation of the conflict detection signals 141 to adapt to current communication conditions and potentially provide increasingly accurate models of the communication between devices that are using another protocol.

Figure 9:
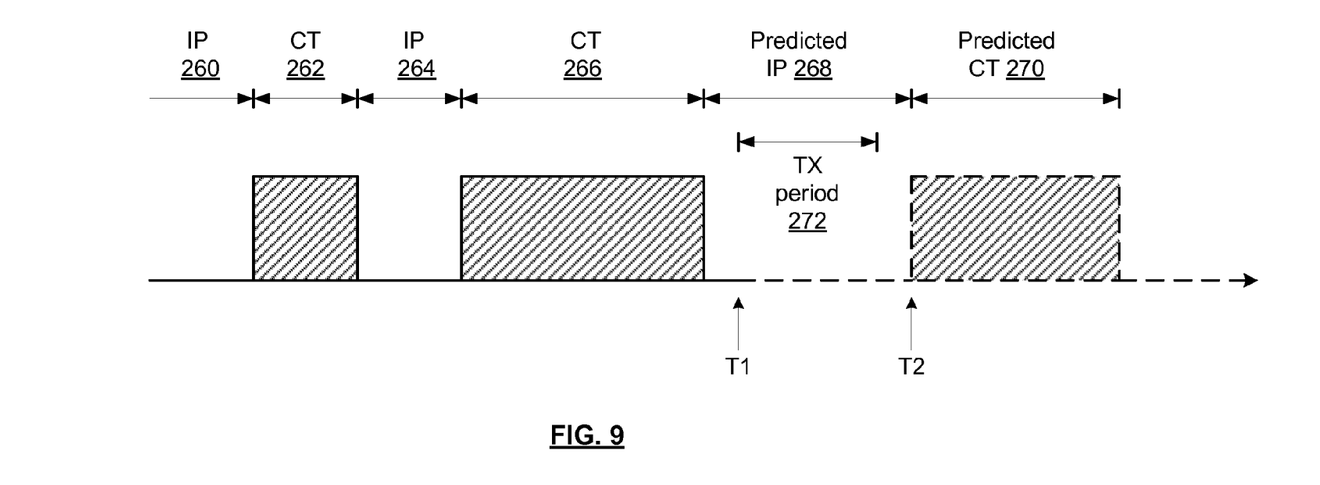
FIG. 9 is a graphical representation of timing diagram in accordance an embodiment of the present invention.

FIG. 9 is a graphical representation of timing diagram in accordance an embodiment of the present invention. In particular, an example timing diagram is shown that reflects conflict detection signals 141 that indicate gaps 260 and 264 and conflicting transmissions 262 and 266 as shown. At time T1, based on an identification of particular template that fits the patterns set forth by idle periods 260 and 264 and conflicting transmissions 262 and 266, based on a model that matches idle periods 260 and 264 and conflicting transmissions 262 and 266 along with an aggregation of other past conflict detection signals 141, or based on other statistical analysis, an idle period is predicted that ends at time T2 with the commencement of a predicted conflicting transmission 270. Idle prediction data that reflects the predicted idle period 268 can be used by transmission control module 236 to generate transmit control signals 143 to transmit during transmit period 272.

Figure 10:
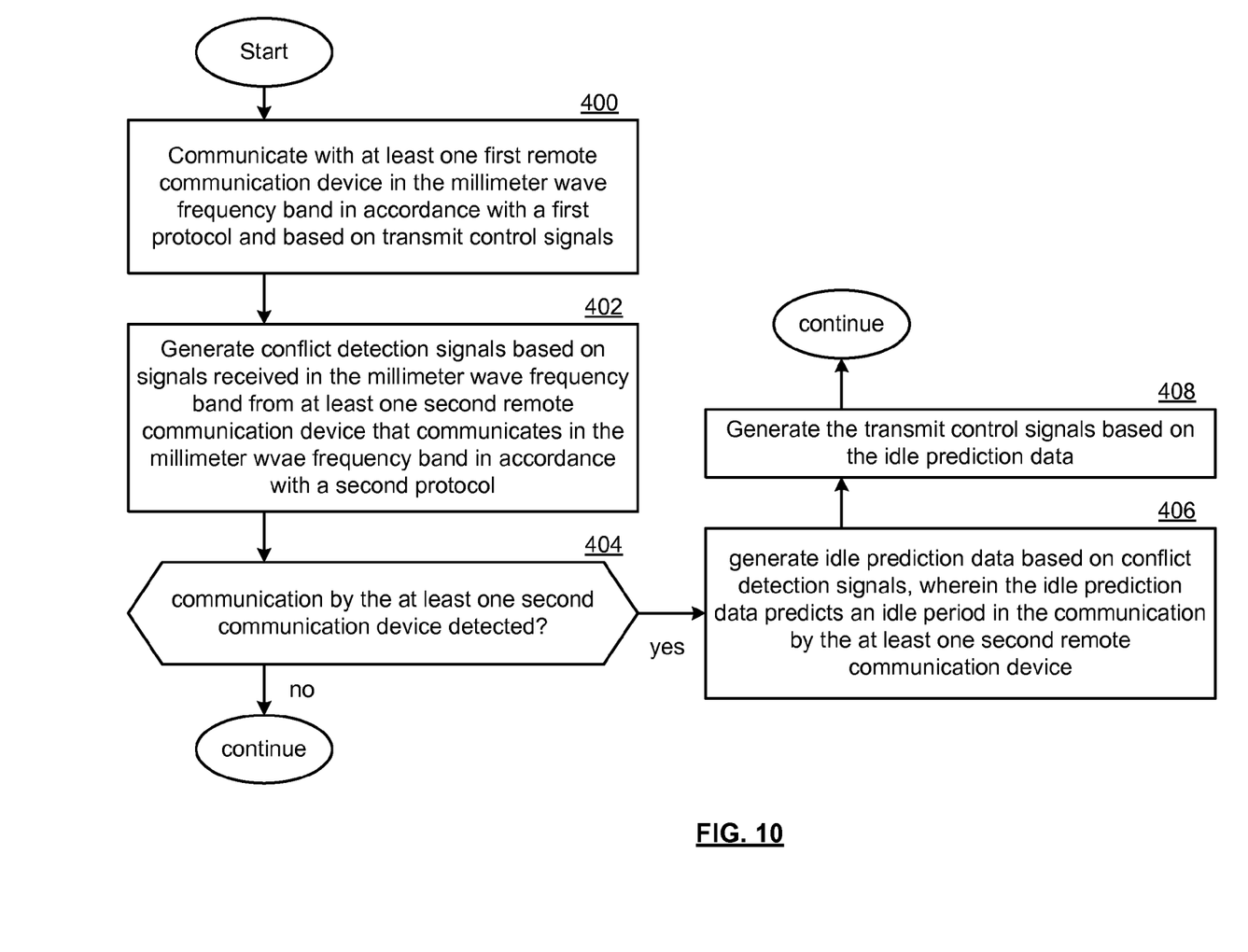
FIG. 10 is a flowchart representation of an embodiment of a method in accordance with the present invention.

FIG. 10 is a flowchart representation of an embodiment of a method in accordance with the present invention. In particular, a method is presented for use in conjunction with one or more features and functions described in conjunction with FIGS. 1-9. In step 400, at least one first remote communication device communicates in the millimeter wave frequency band in accordance with a first protocol, and based on transmit control signals. In step 402, conflict detection signals are generated based on signals received in the millimeter wave frequency band from at least one second remote communication device that communicates in the millimeter wave frequency band in accordance with a second protocol. In step 404, the method determines if communication by the at least one second communication device is detected, based on the conflict detection signals. If so, the method progresses to step 406 by generating idle prediction data based on the conflict detection signals, wherein the idle prediction data predicts an idle period in the communications by the at least second remote communication device. In step 408, the transmit control signals are generated, based on the idle prediction data.

In an embodiment of the present invention, the first protocol includes a wireless high definition communication standard and the second protocol includes a next generation millimeter wave communication standard. The millimeter wave frequency band can include a V-band. Step 402 can generate the conflict detection signals based on at least one of: a signal strength indication; a tone pattern indicating communication in accordance with the second protocol; a bit error rate; a packet error rate; a retransmission rate; and a frequency spectrum indicative of transmission in accordance with the second protocol.

Step 406 can generate the idle prediction data based on: an identification of the second protocol; an identification of a data rate of the second protocol; a statistical analysis of the conflict detection signals. Step 406 can include storing a plurality of templates; identifying one of the plurality of templates based on the conflict detection signals; and generating the idle prediction data based on the identified one of the plurality of templates. Step 406 can include aggregating the conflict detection signals; generating a model based on the aggregation of the conflict detection signals; and generating the idle prediction data based on the model. Step 406 can further include updating the aggregation of the conflict detection signals; and updating the model based on the updated aggregation of the conflict detection signals.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output (s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention has been described in conjunction with various illustrative embodiments that include many optional functions and features. It will be apparent to those skilled in the art that the disclosed invention may be modified in numerous ways, the functions and features of these embodiments can be combined in other embodiments not expressly shown, and may assume many embodiments other than the preferred forms specifically set out and described above. Accordingly, it is intended by the appended claims to cover all modifications of the invention which fall within the true spirit and scope of the invention.

What is claimed is:

1. An adaptive communication device for communicating in a millimeter wave frequency band, the device comprising:
a transceiver for communicating with at least one first remote communication device in the millimeter wave frequency band in accordance with a first protocol, the transceiver generating conflict detection signals based on signals received in the millimeter wave frequency band from at least one second remote communication device that communicates in the millimeter wave frequency band in accordance with a second protocol;
a control module, coupled to the transceiver, that includes:
a conflict detection module that detects communication by the at least one second communication device based on the conflict detection signals and generates a model trigger signal in response thereto;
a conflict modeling module, coupled to the conflict detection module, that responds to the model trigger signal by generating idle prediction data based on the conflict detection signals, wherein the idle prediction data predicts an idle period in the communications by the at least one second remote communication device based on a pattern of communications from the at least one second remote communication device and wherein the conflict modeling module includes:
a template storage module that stores a plurality of templates; and
a template identification module, coupled to the template storage module, that identifies one of the plurality of templates based on the conflict detection signals and that generates the idle prediction data based on the identified one of the plurality of templates; and
a transmission control module, coupled to the conflict modeling module and the transceiver, that generates transmit control signals based on the idle prediction data;
wherein the transceiver times transmissions sent to the at least one first remote communication device based on the transmit control signals.

2. The adaptive communication device of claim 1 wherein the first protocol includes a wireless high definition communication standard; and the second protocol includes a next generation millimeter wave communication standard.

3. The adaptive communication device of claim 1 wherein the transceiver generates the conflict detection signals based on at least one of: a signal strength indication; a tone pattern indicating communication in accordance with the second protocol; a bit error rate; a packet error rate; a retransmission rate; and a frequency spectrum indicative of transmission in accordance with the second protocol.

4. The adaptive communication device of claim 1 wherein the conflict modeling module generates the idle prediction data further based on an identification of the second protocol.

5. The adaptive communication device of claim 1 wherein the conflict modeling module generates the idle prediction data further based on an identification of a data rate of the second protocol.

6. The adaptive communication device of claim 1 wherein the conflict modeling module generates the idle prediction data further based on a statistical analysis of the conflict detection signals.

7. A method for use in an adaptive communication device for communicating in a millimeter wave frequency band, the method comprising:
communicating with at least one first remote communication device in the millimeter wave frequency band in accordance with a first protocol, based on transmit control signals;
generating conflict detection signals based on signals received in the millimeter wave frequency band from at least one second remote communication device that communicates in the millimeter wave frequency band in accordance with a second protocol;
detecting communication by the at least one second communication device based on the conflict detection signals;
when communication by the at least one second communication device is detected:
generating idle prediction data based on the conflict detection signals, wherein the idle prediction data predicts an idle period in the communications by the at least one second remote communication device based on a pattern of communications from the at least one second remote communication device wherein generating the idle prediction data includes:
storing a plurality of templates;
identifying one of the plurality of templates based on the conflict detection signals and
generating the idle prediction data based on the identified one of the plurality of templates; and
generating the transmit control signals based on the idle prediction data.

8. The method of claim 7 wherein the first protocol includes a wireless high definition communication standard; and the second protocol includes a next generation millimeter wave communication standard.

9. The method of claim 7 wherein the millimeter wave frequency band includes a V-band.

10. The method of claim 7 wherein the conflict detection signals are generated based on at least one of: a signal strength indication; a tone pattern indicating communication in accordance with the second protocol; a bit error rate; a packet error rate; a retransmission rate; and a frequency spectrum indicative of transmission in accordance with the second protocol.

11. The method of claim 7 wherein the idle prediction data is generated based on an identification of the second protocol.

12. The method of claim 7 wherein the idle prediction data is generated based on an identification of a data rate of the second protocol.

13. The method of claim 7 wherein the idle prediction data is generated based on a statistical analysis of the conflict detection signals.

14. An adaptive communication device for communicating in a V-band, the device comprising:
a transceiver for communicating with at least one first remote communication device in the millimeter wave frequency band in accordance with a first protocol, the transceiver generating conflict detection signals based on signals received in the millimeter wave frequency band from at least one second remote communication device that communicates in the millimeter wave frequency band in accordance with a second protocol;
a control module, coupled to the transceiver, that includes:
a conflict detection module that detects communication by the at least one second communication device based on the conflict detection signals and generates a model trigger signal in response thereto;
a conflict modeling module, coupled to the conflict detection module, that responds to the model trigger signal by generating idle prediction data based on the conflict detection signals, wherein the idle prediction data predicts an idle period in the communications by the at least one second remote communication device based on a pattern of communications from the at least one second remote communication device and wherein the conflict modeling module includes:
a template storage module that stores a plurality of templates; and
a template identification module, coupled to the template storage module, that identifies one of the plurality of templates based on the conflict detection signals and that generates the idle prediction data based on the identified one of the plurality of templates; and
a transmission control module, coupled to the conflict modeling module and the transceiver, that generates transmit control signals based on the idle prediction data;
wherein the transceiver times transmissions sent to the at least one first remote communication device based on the transmit control signals.

15. The adaptive communication device of claim 14 wherein the first protocol includes a wireless high definition communication standard; and the second protocol includes a next generation millimeter wave communication standard.

16. The adaptive communication device of claim 14 wherein the transceiver generates the conflict detection signals based on at least one of: a signal strength indication; a tone pattern indicating communication in accordance with the second protocol; a bit error rate; a packet error rate; a retransmission rate; and a frequency spectrum indicative of transmission in accordance with the second protocol.

17. The adaptive communication device of claim 14 wherein the conflict modeling module generates the idle prediction data further based on an identification of the second protocol.

18. The adaptive communication device of claim 14 wherein the conflict modeling module generates the idle prediction data further based on an identification of a data rate of the second protocol.

19. The adaptive communication device of claim 14 wherein the conflict modeling module generates the idle prediction data further based on a statistical analysis of the conflict detection signals.

* * * * *